US010526772B2

(12) United States Patent
Kochan, Jr.

(10) Patent No.: US 10,526,772 B2
(45) Date of Patent: Jan. 7, 2020

(54) AUTOMATIC SHUT OFF VALVE

(71) Applicant: Metropolitan Industries, Inc., Romeoville, IL (US)

(72) Inventor: John R. Kochan, Jr., Naperville, IL (US)

(73) Assignee: METROPOLITAN INDUSTRIES, INC., Romeoville, IL (US)

( * ) Notice: Subject to any disclaimer, the term of this patent is extended or adjusted under 35 U.S.C. 154(b) by 0 days.

(21) Appl. No.: 15/979,930

(22) Filed: May 15, 2018

(65) Prior Publication Data

US 2018/0259383 A1    Sep. 13, 2018

Related U.S. Application Data

(63) Continuation of application No. 14/165,853, filed on Jan. 28, 2014, now Pat. No. 9,989,394.

(60) Provisional application No. 61/765,465, filed on Feb. 15, 2013.

(51) Int. Cl.
*E03B 7/07* (2006.01)
*F16K 37/00* (2006.01)
*G01F 15/00* (2006.01)
*G01F 1/36* (2006.01)

(52) U.S. Cl.
CPC ............ *E03B 7/071* (2013.01); *F16K 37/005* (2013.01); *G01F 1/363* (2013.01); *G01F 15/005* (2013.01); *Y02A 20/15* (2018.01); *Y10T 137/7761* (2015.04)

(58) Field of Classification Search
CPC ........ E03B 7/071; F16K 37/005; G01F 1/363; G01F 15/005; G05D 7/0623; Y10T 137/7761

USPC .................................................. 137/487.5
See application file for complete search history.

(56) References Cited

U.S. PATENT DOCUMENTS

| | | | | |
|---|---|---|---|---|
| 3,705,792 A * | 12/1972 | Peters | ....................... | C03B 1/00 65/29.16 |
| 4,730,637 A * | 3/1988 | White | ....................... | E03B 7/12 137/468 |
| 4,844,110 A * | 7/1989 | Paley | ..................... | F16K 31/046 137/1 |
| 5,076,321 A * | 12/1991 | Terry | ...................... | E03B 7/071 137/460 |
| 5,409,037 A * | 4/1995 | Wheeler | ............... | G01M 3/243 137/487.5 |
| 5,431,182 A * | 7/1995 | Brown | ..................... | G05B 6/05 137/487.5 |
| 5,715,866 A * | 2/1998 | Granger | ............... | A01G 25/165 137/487.5 |
| 5,893,388 A * | 4/1999 | Luker | ..................... | E03B 7/071 137/456 |
| 5,934,302 A * | 8/1999 | Nemelka | ................. | D06F 33/02 137/1 |

(Continued)

*Primary Examiner* — William M McCallister
(74) *Attorney, Agent, or Firm* — Husch Blackwell LLP; George Pavlik

(57) ABSTRACT

A device is disclosed comprising an electrically actuated flow control element and control circuits electrically coupled to the electrically actuated flow control element. The control circuits can receive wireless control signals from a displaced electronic device and responsive thereto, transmit electrical signals to the electrically actuated flow control element to actuate the electrically actuated flow control element from a current flow state to an alternate flow state.

16 Claims, 3 Drawing Sheets

(56) References Cited

U.S. PATENT DOCUMENTS

| | | | | |
|---|---|---|---|---|
| 6,209,576 B1* | 4/2001 | Davis | E03B 7/071 | 137/487.5 |
| 6,475,357 B2* | 11/2002 | Lakshmikanthan | C25D 17/06 | 204/224 R |
| 6,539,315 B1* | 3/2003 | Adams | G01F 1/363 | 702/47 |
| 7,107,822 B2* | 9/2006 | Zachary | G01M 3/2869 | 137/312 |
| 7,426,936 B2* | 9/2008 | Gessaman | F16J 15/004 | 137/312 |
| 7,434,593 B2* | 10/2008 | Noll | F16K 15/063 | 137/15.18 |
| 7,661,439 B2* | 2/2010 | Chester | F15B 5/006 | 137/487.5 |
| 8,839,815 B2* | 9/2014 | Young | F23N 1/005 | 137/554 |
| 9,464,414 B2* | 10/2016 | Shapira | E03C 1/04 | |
| 9,989,394 B2* | 6/2018 | Kochan, Jr. | F16K 37/005 | |
| 2002/0007854 A1* | 1/2002 | Dilger | G01F 1/363 | 137/554 |
| 2002/0129640 A1* | 9/2002 | Summers | F17D 5/04 | 73/46 |
| 2003/0098069 A1* | 5/2003 | Sund | G01F 1/8413 | 137/487.5 |
| 2006/0272830 A1* | 12/2006 | Fima | E03B 1/00 | 169/16 |
| 2007/0068225 A1* | 3/2007 | Brown | F16K 37/0075 | 73/40.5 A |
| 2007/0084512 A1* | 4/2007 | Tegge, Jr. | B63B 13/02 | 137/487.5 |
| 2007/0246550 A1* | 10/2007 | Rodenbeck | E03C 1/057 | 236/12.11 |
| 2012/0215488 A1* | 8/2012 | Carter | F16K 37/0075 | 702/182 |
| 2012/0305084 A1* | 12/2012 | Ball | G01F 15/14 | 137/1 |
| 2013/0110418 A1* | 5/2013 | Nousiainen | G01L 7/00 | 702/50 |
| 2013/0293389 A1* | 11/2013 | Sinsuan | H04B 1/7103 | 340/870.02 |
| 2014/0230924 A1* | 8/2014 | Kochan, Jr. | F16K 37/005 | 137/487.5 |
| 2015/0204701 A1* | 7/2015 | Klicpera | G01M 3/00 | 137/624.11 |

* cited by examiner

AUTOMATIC SHUT OFF VALVE

CROSS-REFERENCE TO RELATED APPLICATION

The present application is a continuation of U.S. patent application Ser. No. 14/165,853 filed Jan. 28, 2014 and entitled "Automatic Shut Off Valve," which claims the benefit of U.S. Provisional Application Ser. No. 61/765,465 filed Feb. 15, 2013 and entitled "Automatic Shut Off Valve." These applications are hereby incorporated by reference in their entirety as if set forth fully herein.

FIELD

The application pertains to shut off valves to control the inflow of pressurized water or other fluids to a home or commercial facility. More particularly, the application pertains to such valves which include one or more electrically actuated valves, and, can be Internet enabled.

BACKGROUND

It is occasionally necessary or desirable for owners or operators of commercial, business or residential buildings or structures, including multi-unit apartment/condominium buildings, to control, limit or shut off the pressurized water supply. Such circumstances can arise for instance in the event of a water leak (downstream of the proposed automatic shut off valve), during the repair of an appliance or plumbing fixture or where the building or dwelling may be unoccupied for an extended period of time. It can further be desirable for owners to limit or control water usage to manage expenses and to conserve resources for environmental purposes.

In light of such conditions and interests, it is generally known that a valve can be connected to a building's water supply line in order to shut off the water when needed. Such known valves, however, have certain limitations. For example, many known valves are manually operable and/or cannot be actuated from a remote location. In addition, such known valves cannot detect the real-time flow conditions within the water supply line and communicate those conditions to the owner/operator. Thus, in certain instances, there is no way to actually shut off the water or confirm that the water has in fact been shut off without being physically present at the building.

Thus, there is a need for an automatic shut-off valve that can be remotely actuated without in-person manual operation. For purposes of increased reliability, it would additionally be desirable for such a device to feature auxiliary control elements should the primary element malfunction or fail. In addition, there is a further need for an automatic shut-off valve that can detect the status of fluid flow within the pipe or supply line and transmit such information to a displaced device or location over a communication network via a wired or wireless connection.

It would further be beneficial if such device could operate off its own local rechargeable power supply if external power is not available or disrupted. Moreover, it would additionally be beneficial for such device to be able to operate self-sufficiently by being able to recharge the power supply if need be.

DETAILED DESCRIPTION

Figure 1:
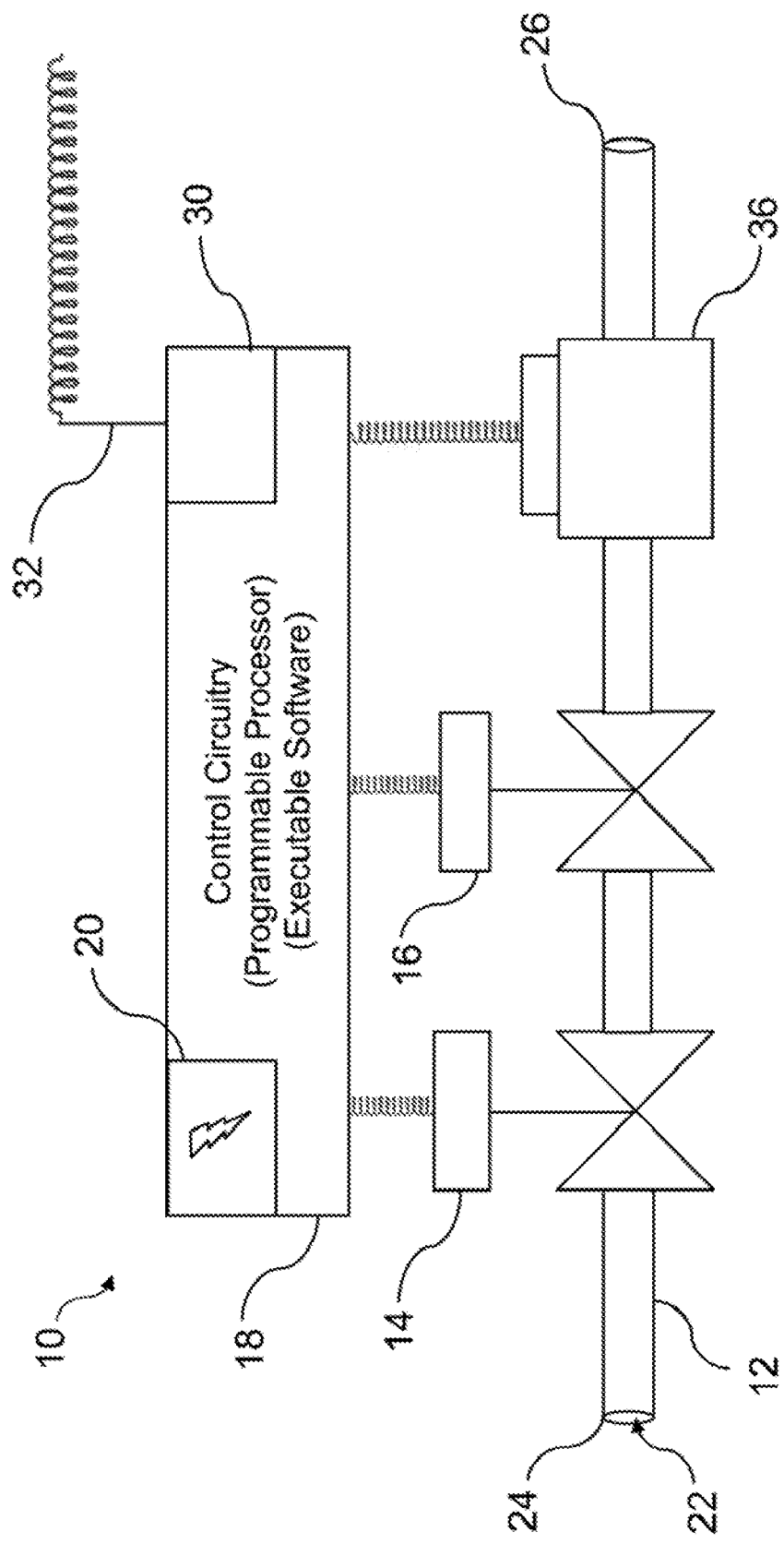
FIG. 1 is a first representative view of a valve according to embodiments disclosed herein.

While disclosed embodiments can take many different forms, specific embodiments hereof are shown in the drawings and will be described herein in detail with the understanding that the present disclosure is to be considered as an exemplification of the principles hereof, as well as the best mode of practicing same, and is not intended to limit the claims hereof to the specific embodiment illustrated.

As described herein, embodiments disclosed herein are directed to an automatic shut off valve incorporating single or multiple electrically actuated valves, a device to detect the fluid flow conditions, and an optional water powered inline generator to energize the valves if external power is not an option for operation. As described herein, the device can be hard wired or fitted with a wireless sensor which can report to a remote monitoring site. Communications can be provided via an internet monitoring portal using a wired or wireless medium.

The valve can be tied into the water feed of a home, business, individual apartments/condos in a multi-unit building or any other application having a pressurized water feed. Once the valve is installed, the owner/operator can, according to the needs of a particular application, set a run limit for the water, such as, for example, 20 minutes. When the set time has run, an alarm prompt can be sent to the motorized or electrically actuated valve which can close the valve and shut down pressurized water supply to the system. The prompt can further provide verification to the owner/operator that the valve has been closed.

If the valve fails to close, one or more secondary valves can be engaged and closed in order to stop the delivery of water. If the alarm prompt is acknowledged, it can be up to the owner/operator/resident to decide to investigate the problem or override the alarm and open the valve based on their knowledge or understanding of the particular equipment or application.

Figure 2:
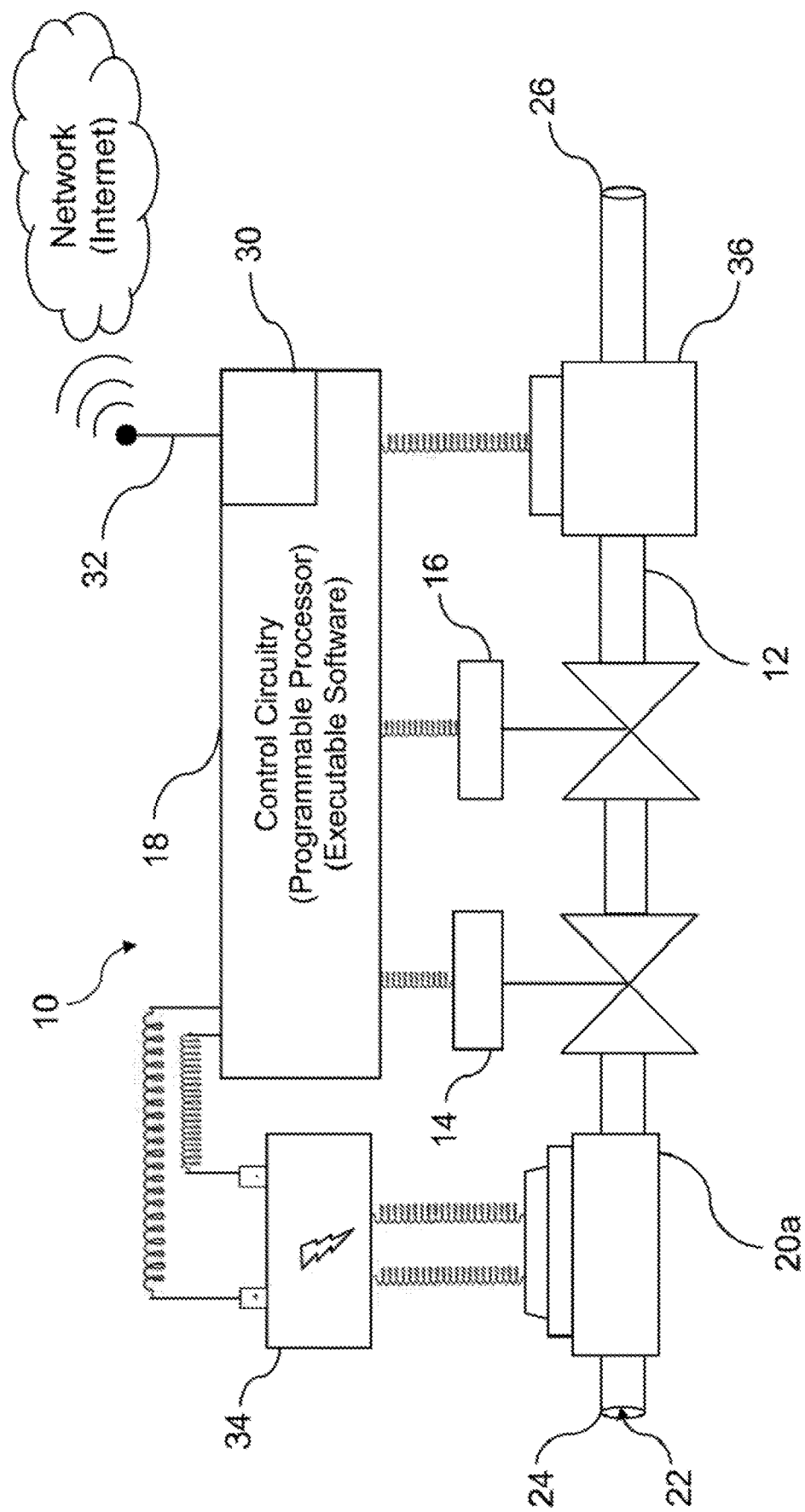
FIG. 2 is a second representative view of a valve according to embodiments disclosed herein.
Figure 3:
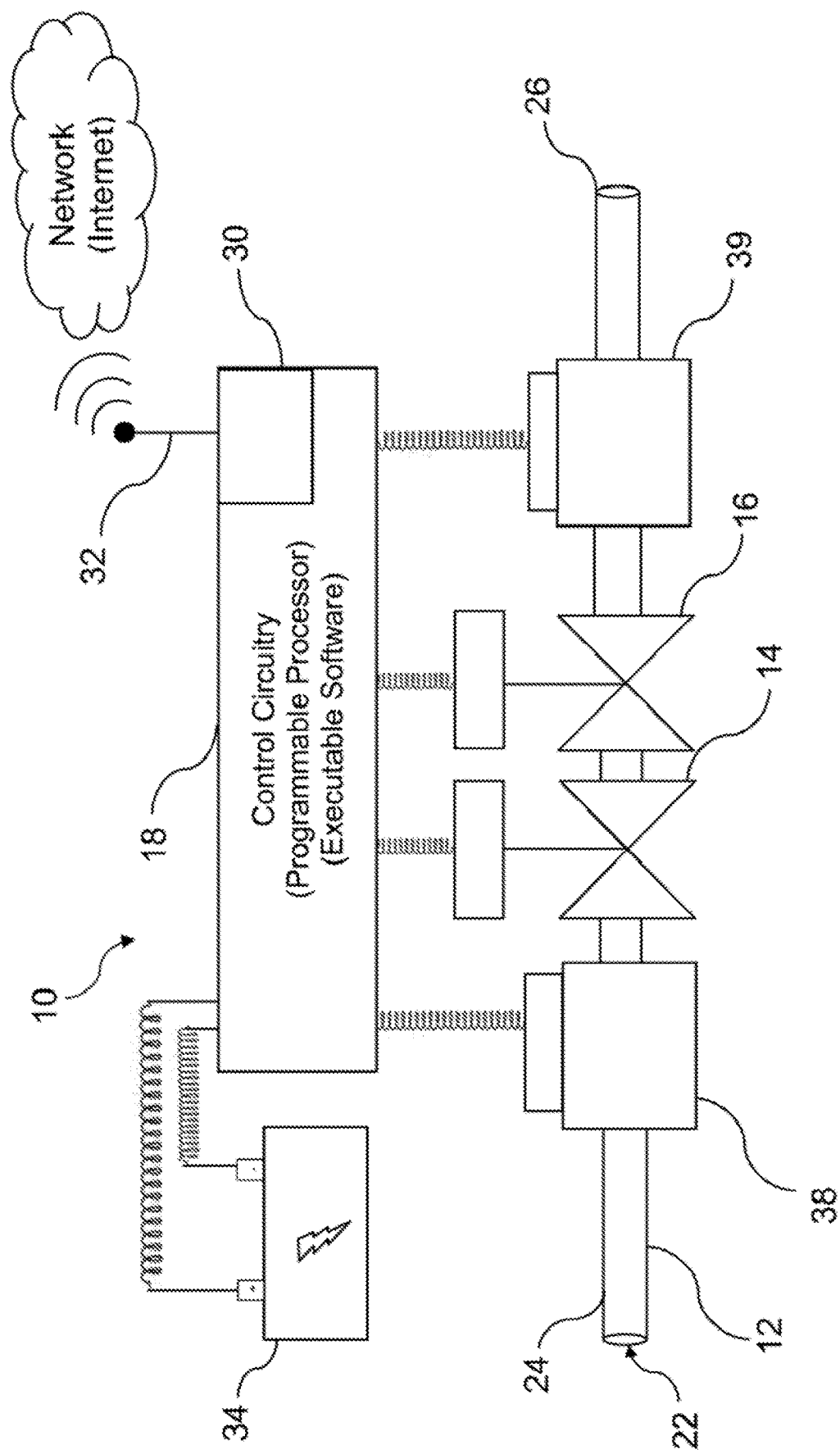
FIG. 3 is a third representative view of a valve according to embodiments disclosed herein.

Now with reference to the figures, FIGS. 1-3 illustrate representative views of an automatic shut-off valve 10 according to embodiments disclosed herein. The valve 10 can feature a flow conduit 12, one or more electrically actuated flow control elements 14, 16, control circuits 18 and a local power source 20. The flow conduit 12 can be a pipe or tube having an interior channel 22, a fluid inflow end 24 and a fluid outflow end 26. The conduit 12 can include, for example, a pipe or tube suitable for carrying water or other liquid and can be made from copper, cast iron, polyvinyl chloride, polypropylene, polyethylene or any other suitable material without limitation.

As illustrated in FIGS. 1-3, the one or more flow control elements 14, 16 can be coupled to the conduit 12 between the inflow end 24 and the outflow end 26. The control elements 14, 16 can be devices such as valves that can regulate, direct or control the flow of fluid through the conduit 12. The control elements 14, 16 can alternate between a blocking state whereby the interior channel 22 of the conduit 12 is partially or entirely obstructed thus restricting or blocking fluid flow and a flow state whereby the interior channel 22 is substantially clear and fluid is permitted to flow through the valve with little or no obstruction.

Although FIGS. 1-3 illustrate the valve having two control elements 14, 16, persons of ordinary skill in the art will understand that the valve 10 can have just one control element or more than two control elements as desired. In addition, it will be further recognized that where a plurality of control elements are provided, the control elements can be of the same type or can be of different types without departing from the novel scope of the subject. Examples of different types of control elements 14, 16 that can be used, include, without limitation: ball valves, butterfly valves, solenoid valves, check valves, disc valves, needle valves and/or any other type of device suitable for controlling fluid flow through the conduit 12.

According to embodiments presented herein, the control elements 14, 16 can be electrically coupled to control circuitry 18a, 18b and a local power source 20 and can be electrically actuated to switch between the flow state and the blocking state in response to a signal received from a displaced source or device. The control circuitry 18 can include a programmable processor for executing control programs and a communications interface 30 for transmitting and receiving signals between a displaced source or device via wired or wireless communication. In the embodiment illustrated in FIG. 1, for example, the valve 10 is configured for wired communication via a hardwire connection 32 to a displaced source or device. In the embodiment illustrated in FIGS. 2 and 3, the valve 10 is configured for wireless communication through a network enabled wireless communications interface 30b via a public or private computer network.

As illustrated in FIG. 2, the local power source can be a fluid driven in-line generator 20a which is coupled to a rechargeable battery 34 such that the energy associated with the movement of fluid within the channel can be converted to electrical energy to energize the battery 34. The rechargeable battery 34 can alternatively or additionally be powered (via wired or wireless connection) from a displaced source such as for example a fluid-actuated generator, a wind turbine, or solar-activated source.

The valve 10 according to embodiments disclosed herein can also include a flow measurement device for detecting the fluid flow through the interior channel 22 of the conduit 12. As shown in FIGS. 1-2, the flow measurement device can be an electromechanical or optical flow meter 36 which can be affixed to the conduit 12 between the inflow end 24 and outflow end 26 and can gauge the flow rate of fluid through the interior channel 22. The flow meter can also be electrically coupled to the control circuitry 18 such that information regarding the flow rate can be transmitted to a displaced source or device via wired or wireless connection.

FIG. 3 illustrates an alternative embodiment featuring one or more pressure sensors 38, 39 that can be affixed to the conduit 12 adjacent the inflow and outflow ends 24, 26. According to this embodiment, fluid flow can be detected and quantified by measuring the differential pressure within the interior channel 22. Such detection can be accomplished by throttling one of the control elements 14, 16 and examining incoming and outgoing pressure in the system. Hence, a pressure drop detected by the sensors 38, 39 during such throttling exercise provides a positive indication that fluid was flowing in the structure. The sensors 38, 39 can also be electrically coupled to the control circuitry 18 such that information regarding the differential pressure can be transmitted to a displaced source or device via wired or wireless connection and the internet.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown, or sequential order, to achieve desirable results. Other steps may be provided, or steps may be eliminated, from the described flows, and other components may be add to, or removed from the described embodiments.

What is claimed is:

1. A device comprising:
an electrically actuated flow control element having not more than one inlet securable to and in fluid communication with a single fluid conduit, the electronically actuated flow control element having a current flow state and an alternate flow state relative to fluid flow therethrough wherein the current flow state permits unconstrained fluid flow through the flow control element from the single fluid conduit and the alternate flow state prevents fluid flow through the fluid conduit at the flow control element;
a flow condition sensor affixed to the single fluid conduit to gather flow information regarding the fluid flow though the electrically actuated flow control element; and
control circuits having a wireless communication device, the control circuits being electrically coupled to the electrically actuated flow control element and the flow condition sensor,
wherein the control circuits receive the flow information from the flow condition sensor and flow state information from the electrically actuated flow control element indicating whether the electronically actuated flow control element is in the current flow state or the alternate flow state,
wherein the control circuits upload the flow information and the flow state information to an internet monitoring portal via the wireless communication device,
wherein the control circuits receive, via the wireless communications device, wireless control signals from the internet monitoring portal, the wireless control signals being at least one of a first control command to actuate the flow control element from the current flow state to the alternate flow state or a second control command to actuate the flow control element from the alternate flow state to the current flow state, the first control command being a command to permit fluid flow through the flow control element from single fluid conduit, the second control command being a command for the flow control element to block fluid flow through the single fluid conduit, and responsive thereto, transmit electrical signals to the electrically actuated flow control element, the electrically actuated flow control element being actuated from the current flow state to the alternate flow state upon receipt of the first control command and the electrically actuated flow control element being actuated from the alternate flow state to the current flow state upon receipt of the second control command.

2. The device of claim 1 wherein the flow condition sensor is a flow meter and the flow information includes a flow rate through the electrically actuated flow control element.

3. The device of claim 1 wherein the flow condition sensor is a pressure sensor and the flow information includes a pressure differential between an inflow end and an outflow end of the device.

4. The device of claim 3 wherein the control circuits throttle the electrically actuated flow control element to measure the pressure differential between the inflow end and the outflow end of the device.

5. The device of claim 1 wherein the control circuits determine a continuous flow time through the electrically actuated flow control element using the flow information from the flow condition sensor, compare the continuous flow time to a run time limit, and, when the continuous flow time is greater than or equal to the run time limit, automatically transmit the electrical signals to the electrically actuated flow control element to actuate the electrically actuated flow control element from the current flow state to the alternate flow state.

6. The device of claim 5 wherein the control circuits verify whether the electrically actuated flow control element is in the alternate flow state using the flow information from the flow condition sensor and transmit a result thereof to the internet monitoring portal.

7. The device of claim 6 wherein, when the flow state information indicates that the electrically actuated flow control element is not in the alternate flow state, the control circuits transmit electrical signals to a second electrically actuated flow control element to actuate the second electrically actuated flow control element from a current flow state to an alternate flow state.

8. A method comprising:
providing an electrically actuated flow control element, the electrically actuated flow control element having not more than one inlet securable to and in fluid communication with a single fluid supply line, the electronically actuated flow control element having a current flow state and an alternate flow state relative to fluid flow therethrough wherein the current flow state permits unconstrained fluid flow through the flow control element from the single fluid supply line and the alternate flow state prevents fluid flow through the single fluid supply line at the flow control element;
providing control circuits electrically coupled to the electrically actuated flow control element and a flow condition sensor affixed to the single fluid conduit, the control circuits receiving flow information regarding the fluid flow though the electrically actuated flow control element from the flow condition sensor and flow state information from the electrically actuated flow control element, the flow state information indicating whether the electronically actuated flow control element is in the current flow state or the alternate flow state;
the control circuits uploading the flow information and the flow state information to an internet monitoring portal via a wireless communication device of the control circuits;
the control circuits receiving, via the wireless communications device, wireless control signals from the internet monitoring portal, the wireless control signals being at least one of a first control command to actuate the flow control element from the current flow state to the alternate flow state or a second control command to actuate the flow control element from the alternate flow state to the current flow state, the first control command being a command to permit fluid flow through the flow control element from single fluid supply line, the second control command being a command for the flow control element to block fluid flow through the single fluid supply line;
responsive to receiving the wireless control signals, the control circuits transmitting electrical signals to the electrically actuated flow control element, and
the electrically actuated flow control element actuating from the current flow state to the alternate flow state in response to receipt of the first control command and actuating the electronically actuated flow control element from the alternate flow state to the current flow state in response to receipt of the second control command.

9. The method of claim 8 wherein the flow condition sensor is a flow meter and the flow information includes a flow rate through the electrically actuated flow control element.

10. The method of claim 9 wherein the flow condition sensor is a pressure sensor and the flow information includes a pressure differential between an inflow end and an outflow end straddling the electrically actuated flow control element.

11. The method of claim 10 further comprising throttling the first electrically actuated flow control element by the control circuits and measuring the pressure differential between the inflow end and the outflow end.

12. The method of claim 8 further comprising:
determining a continuous flow time of the fluid through the electrically actuated flow control element using the flow information;
comparing the continuous flow time to a run time limit; and
when the continuous flow time is greater than or equal to the run time limit, automatically transmitting the electrical signals to the electrically actuated flow control element, and
actuating the electrically actuated flow control element from the current flow state to the alternate flow state.

13. The method of claim 12 further comprising:
verifying whether the electrically actuated flow control element is in the alternate flow state using the flow information; and
transmitting a result of the verifying to the internet monitoring portal.

14. The method of claim 13 further comprising, when the flow state information indicates that the first electrically actuated flow control element is not in the alternate flow state, transmitting the electrical signals to a second electrically actuated flow control element to actuate the second electrically actuated flow control element from a current flow state to an alternate flow state.

15. A device comprising:
an electrically actuated flow control element having not more than one inlet securable to and in fluid communication with a fluid conduit, the electronically actuated flow control element having a current flow state and an alternate flow state relative to fluid flow therethrough wherein the current flow state permits unconstrained fluid flow through the flow control element from the fluid conduit and the alternate flow state prevents fluid flow through the fluid conduit at the flow control element;
a flow condition sensor affixed to the single fluid conduit to gather flow information regarding the fluid flow though the electrically actuated flow control element; and
control circuits having a wireless communication device, the control circuits being electrically coupled to the electrically actuated flow control element and the flow condition sensor, wherein the control circuits receive the flow information from the flow condition sensor and flow state information from the electrically actuated flow control element indicating whether the electronically actuated flow control element is in the current flow state or the alternate flow state, wherein the control circuits upload the flow information and the flow state information to an internet monitoring portal over a network via the wireless communication device, wherein the control circuits wirelessly communicate, via the wireless communication device, with the internet monitoring portal over the network to receive at least one of a first control command to actuate the electrically actuated flow control element from the current flow state to the alternate flow state or a second control command to actuate the flow control element from the alternate flow state to the current flow state, the first control command being a command to permit fluid flow through the flow control element from fluid conduit, the second control command being a command for the flow control element to block fluid flow through the fluid conduit.

16. The device of claim 15 wherein the flow condition sensor includes a pressure sensor, and wherein the flow information includes a pressure differential between an inflow end and an outflow end separating the electrically actuated flow control element.

\* \* \* \* \*